United States Patent
Toillon et al.

(10) Patent No.: US 9,647,960 B2
(45) Date of Patent: May 9, 2017

(54) SWITCHED DATA TRANSMISSION SYSTEM ALLOWING THE CANCELLATION OF TIME DEPENDENT LOOPS AND USABLE IN PARTICULAR IN AVIONICS APPLICATIONS

(71) Applicant: Thales, Neuilly sur Seine (FR)

(72) Inventors: Patrice George Paul Toillon, Meudon la Foret (FR); David Jose Faura, Meudon la Foret (FR); Thomas Criqui, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 15 days.

(21) Appl. No.: 14/317,546

(22) Filed: Jun. 27, 2014

(65) Prior Publication Data
US 2015/0003286 A1    Jan. 1, 2015

(30) Foreign Application Priority Data

Jun. 28, 2013    (FR) ...................... 13 01541

(51) Int. Cl.
*H04L 12/947*    (2013.01)
*H04L 12/40*    (2006.01)
*H04L 12/433*    (2006.01)
*H04L 12/46*    (2006.01)
*H04L 12/24*    (2006.01)
*H04L 29/08*    (2006.01)

(52) U.S. Cl.
CPC .......... *H04L 49/25* (2013.01); *H04L 12/4015* (2013.01); *H04L 12/40163* (2013.01); *H04L 12/433* (2013.01); *H04L 12/4616* (2013.01); *H04L 41/12* (2013.01); *H04L 67/12* (2013.01); *H04L 2012/4028* (2013.01)

(58) Field of Classification Search
None
See application file for complete search history.

(56) References Cited

U.S. PATENT DOCUMENTS

| | | | |
|---|---|---|---|
| 4,168,400 | A | 9/1979 | De Couasnon et al. |
| 4,404,557 | A | 9/1983 | Grow |

(Continued)

FOREIGN PATENT DOCUMENTS

| | | |
|---|---|---|
| EP | 0 089 159 | 9/1983 |
| EP | 0 258 604 | 3/1988 |

OTHER PUBLICATIONS

French Search Report dated Jan. 23, 2014, from corresponding French Application No. 1301541.

*Primary Examiner* — Christopher Crutchfield
*Assistant Examiner* — Tito Pham
(74) *Attorney, Agent, or Firm* — Troutman Sanders LLP

(57) ABSTRACT

This switched data transmission system, that may be used in particular in avionics applications, of the type comprising a plurality of electronic devices and equipment units adapted for transmitting discrete messages over a transmission network, and in which each of the equipment units is connected to a network switch, the switches being connected to each other by means of data transmission links so as to form a physical topology of a loop network, each message being associated with information regarding data flow priority in the network comprising of functional priority information, is characterized in that each message is also associated with information regarding topological priority of data flow in the network.

4 Claims, 4 Drawing Sheets

(56) References Cited

U.S. PATENT DOCUMENTS

| | | | |
|---|---|---|---|
| 4,680,757 A * | 7/1987 | Murakami | H04L 12/433 |
| | | | 370/455 |
| 4,726,018 A | 2/1988 | Bux et al. | |
| 5,218,676 A * | 6/1993 | Ben-Ayed | G06F 13/37 |
| | | | 709/240 |
| 5,274,637 A | 12/1993 | Sakamura et al. | |
| 2003/0053414 A1* | 3/2003 | Akahane | H04L 45/00 |
| | | | 370/216 |
| 2010/0220593 A1* | 9/2010 | Fujiwara | H04L 47/10 |
| | | | 370/235 |

* cited by examiner

SWITCHED DATA TRANSMISSION SYSTEM ALLOWING THE CANCELLATION OF TIME DEPENDENT LOOPS AND USABLE IN PARTICULAR IN AVIONICS APPLICATIONS

CROSS-REFERENCE TO RELATED APPLICATIONS

The present application claims priority to French Patent Application No. 13 01541 filed Jun. 28, 2013, which is herein incorporated by reference in its entirety.

FIELD OF THE INVENTION

The present invention relates to a switched data transmission system, particularly for use in avionics applications.

BACKGROUND

There already exist in the state of the art a certain number of systems of this type which include a plurality of electronic devices and equipment adapted for transmitting discrete messages over a data transmission network generally by means of frames.

Each of the devices is then connected to a network switch or frame switch, the switches being connected to each other by means of data transmission links so as to form a physical topology of a loop data transmission network.

Systems of this kind may for example correspond to various types of standards such as ARINC 664 or Ethernet IEEE 802.3 or still others.

These switch based systems also referred to by the English term "switched" (French: "commutés"), are well known in the state of the art and thus provide the ability to ensure the transmission of messages between different devices which is effected by using defined frame formats.

In the state of the art, the management of the message traffic flow over the network is performed at the level of frames.

Such management is carried out in part, based on the transmission related information such as in particular, information as to priority of the elementary logic stream to which the message in question belongs, and hence to which the frames associated therewith for their transmission over the network belong.

In the state of the art, such priority information pertains to so called functional priority information, that is to say, for example, related to the nature and importance of the function performed by the corresponding device or equipment and by the relevant message considered.

It is then understood that these systems involve implementation of analytical means for analysing these priority related information and data in order to manage the flow of messages across the network according to the respective levels of priority thereof and for each of the elementary logic streams to which they belong.

However this type of loop physical topology presents a certain number of drawbacks induced by certain uses of this topology in the loop topology networks.

Indeed there appear to be constraints and limitations in the case where the elementary logic streams supported, share common physical parts of the propagation path.

Thus for example, if these elementary logic streams share the same output ports of switches, this would result in the fact that one could face the situation, for instance, of being unable to compute an upper bound on the transmission time (maximum end to end latency) for all of the elementary logic streams having the same so called functional priority.

This leads to the calculation of end to end maximum latency becoming non convergent thereby resulting in the inability to prove the determinism of the network thus making it impossible to use due to it being no longer possible to appropriately satisfy, for example, the criteria for analysis and validation of such systems, in particular in avionics applications.

The objective of the invention is thus to provide a solution for the communication architecture with principles and mechanisms that enable the cancellation of each of the time dependent loops thus facilitating the use of the network because it no longer imposes constraints for routing elementary logic streams (exclusion of routing) and rendering possible the calculation of maximum latency of each of the elementary logic streams, that is to say that, the deterministic nature is demonstrable.

SUMMARY

To this end, the object of the invention relates to a switched data transmission system, that may be used in particular in avionics applications, of the type comprising a plurality of electronic devices and equipment units adapted for transmitting discrete messages over a transmission network, and in which each of the devices and equipment units is connected to a network switch, the switches being connected to each other by means of data transmission links so as to form a physical topology of a loop network, each message being associated with information regarding data flow priority in the network comprising of functional priority information, characterised in that each message is also associated with information regarding topological priority of data flow in the network.

According to other characteristic features of the system according to the invention, taken into consideration individually or in combination:

several levels of topological priority are defined for each level of functional priority;

functional priority levels take precedence over topological priority levels;

each network switch associates the highest level of topological priority in the corresponding level of functional priority, with a message sent by electronic equipment unit connected to the switch;

each network switch, through which a message passes, associates a topological priority level upon output of the message that is lower than that at the input of this message in this switch;

the priority information is embedded at least in part in the messages;

the priority information is embedded at least in part in the configuration tables of the network, associated with the switches;

each switch has a corresponding configuration table associated with the means that form the selector of messages in view of their propagation in the network.

BRIEF DESCRIPTION OF THE DRAWINGS

The invention will be better understood with the aid of the description which follows, provided solely by way of example and with reference made to the accompanying drawings, in which.

DETAILED DESCRIPTION

Figure 1:
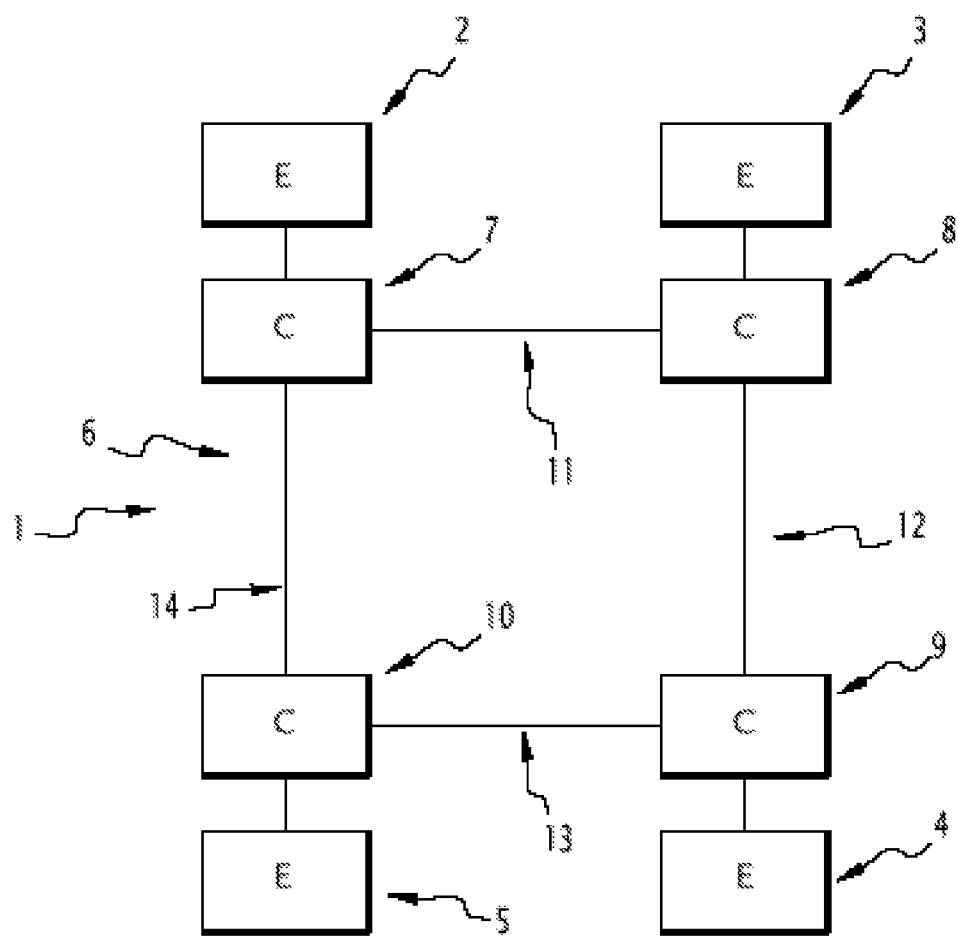
FIG. 1 is a block diagram illustrating the general structure of a switched data transmission system with loop physical topology according to the invention, FIG. 2 schematically illustrates the information relating to message flow priority in the network, as implemented in a system according to the invention, FIG. 3 schematically illustrates the modification of a topological priority level of a message during its passage through a network switch, in a transmission system according to the invention.

In effect presented in a general manner in FIG. 1, is an illustration of a data transmission system.

This system is designated by the general reference numeral 1 in this figure and consists of a switched data transmission system usable in particular in avionics applications.

Thus, such a system may include a plurality of electronic devices and equipment units, of which four are illustrated in this figure and are designated by the general reference numerals 2, 3, 4 and 5.

In a conventional manner these electronic devices and equipment units are designed to send discrete messages over a data transmission and communications network designated by the general reference numeral 6 in this FIG. 1.

Each of these devices and equipment units is then connected, also in conventional manner, as illustrated, to a network switch.

Thus, for example, the devices/equipment units 2, 3, 4 and 5 are connected respectively to the network switches 7, 8, 9 and 10.

These switches are generally known by their generic English appellation of "switches" and together form a so called switched system of data transmission or communication.

In this type of network, the transmission of data and information is carried out on a conditional basis, that is to say, in which at least part of the routing of the message depends on the message itself, as is already well known.

As illustrated, the switches are connected to each other by data transmission links in a manner so as to form a physical topology of a loop network also known as "looped" network.

Thus, for example the link means for data transmission linking respectively designated by the reference numerals 11, 12, 13 and 14 are used to connect the switches 7, 8, 9 and 10 between themselves respectively.

Also in a conventional manner, each discrete message sent over this network is associated with information regarding data flow priority in the network.

This priority related information can then be used to define and manage by way of scheduling the pass through of messages over this network and in particular, over the data transmission links between the switches or even within the latter, that is to say on each of the output ports of each switch.

In a conventional manner, this information regarding data flow priority in the network includes information relating to functional priority. The functional priority related data and information are then defined for the message considered and, in particular, by the function or functions performed by the electronic equipment-thereof.

Indeed it may be easily understood that the functions may be qualified as taking priority over others and thereby lead to the establishment of a hierarchy amongst them.

Such functional priority information may then be used to establish a table or even a ranking of priorities for transmission of messages in relation to each other across the network.

As has been indicated previously, systems of this type present a certain number of drawbacks.

In order to resolve these, in the transmission system according to the invention, all the messages sent over the network or at least some amongst them, are also associated with information regarding topological priority of data flow in the network.

Such topological priority related information then no longer depends on messages of functions supported by the electronic devices and equipment units deploying these but rather, they are determined by the structure and topology of the network.

Thus, for example, a message transmitted by a given equipment unit through its associated network switch, may be of a higher level of topological priority than a message received from a switch placed upstream in the network.

Figure 2:
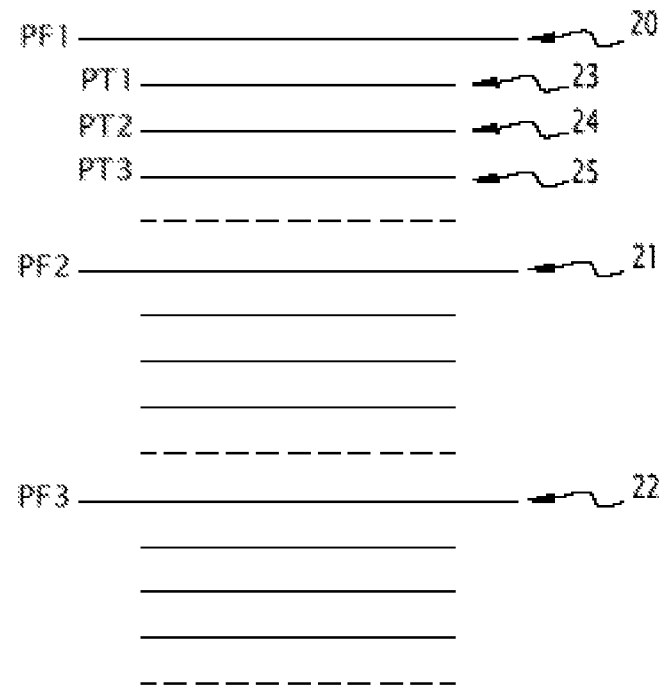

This is illustrated in a schematic fashion in FIG. 2.

In fact presented in this FIG. 2, are the functional priority levels such as, for example the levels PF1, PF2, PF3 designated by the general reference numerals 20, 21 and 22.

Several levels of topological priority may be defined for each level of functional priority.

Thus, for example, different levels of topological priority PT1, PT2, PT3 etc designated by the general reference numerals 23, 24 and 25 in this FIG. 2, may be defined for the functional priority level PF1, 20.

It goes without saying that the functional priority levels, as has been illustrated, take precedence over topological priority levels.

Indeed, management of the flow of information in the network will initially be effected based on the functional priority related information and then on the topological priority related information, and this will be in accordance with their respective hierarchy, which then makes it possible to calculate the maximum latency of propagation of messages in the network.

Figure 3:
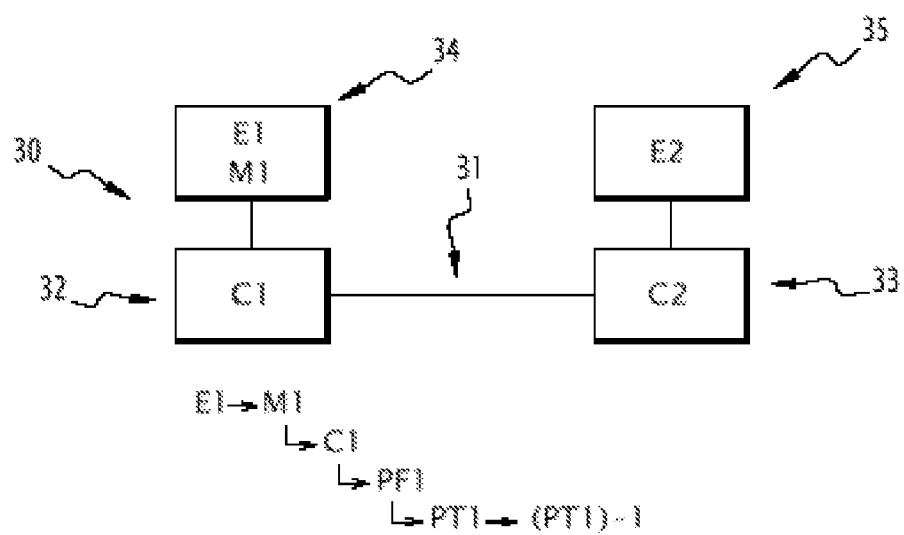

Illustrated in FIG. 3 is an example of the implementation and management of these priorities.

It can be recognised in effect that in this FIG. 3, is presented a portion of a switched data transmission system designated by the general reference numeral 30.

This portion of the transmission system then includes a network portion designated by the general reference numeral 31 between two switches 32 and 33 respectively connected to functional equipment units 34 and 35.

We shall explain the operation of this part of the system, starting from an example in which the equipment unit E1 34 transmits a message M1 over the network through the network switch C1 32. This message M1 then has a functional priority level of, for example, PF1. In this case, the switch C1 32 associates with this message the highest level of topological priority within the functional priority level corresponding to this message.

Thus, in the example described, the switch C1 32 then associates with this message M1 not only a functional priority level, for example PF1, but also a topological priority level PT1 that is the highest within this functional priority level.

This message M1 is then transmitted in maximum topological priority over the network portion 31 to the switch C2 33.

The latter, as it has been illustrated, will then, during the transit of the message M1 through the switch, associate with this message M1 an output topological priority level that is lower than that at input.

This is, for example, illustrated in FIG. 3 by the entry (PT1)-1 to illustrate the fact that the switch C2 33, will, for example, reduce the level of topological priority of this message.

It should also be noted that as for the functional priority level, it has not changed.

This process may then be repeated in the various switches along the network as appropriate to the propagation of messages therein.

Needless to say it is obviously understood that various embodiments of these means may be envisaged.

Figure 4:
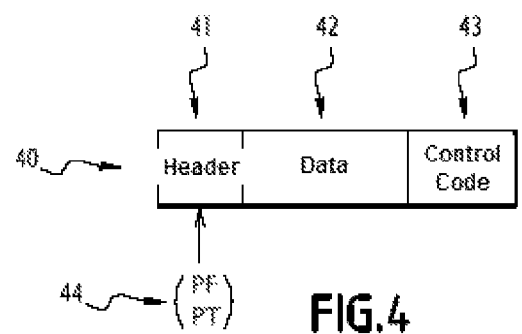
FIG. 4 shows an example of embedding/integration of priority information in a message.

Thus, for example, and as has been illustrated in FIG. 4, the priority information may be directly embedded at least in part in the messages.

The illustration in this FIG. 4 shows a message designated by the general reference numeral 40 and which in a conventional manner includes a header 41, some data 42 and a word or control code 43.

The priority information designated by the general reference numeral 44, may then be embedded at least in part, for example in the header 41 of this message.

Figure 5:
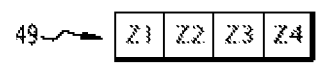
FIG. 5 illustrates an alternative embodiment for the embedding/integration of this priority information into the network configuration tables, and FIG. 6 schematically illustrates the general structure of an example of implementation of a network switch that goes to make up an embodiment of a data transmission system according to the invention.
Figure 5:
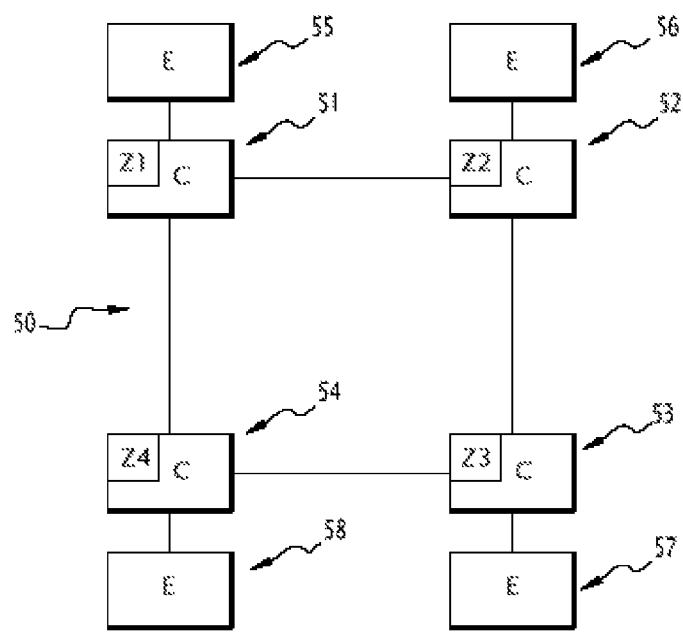

However, and as it has been illustrated in FIG. 5, this priority information may also be embedded at least in part, in the configuration tables of the network, associated with the switches. For example such a table is illustrated and designated by the general reference numeral 49 in this Figure.

Thus, for example the illustration in FIG. 5 shows a transmission system according to the invention, designated by the general reference numeral 50 and which continues to include switches 51, 52, 53 and 54 respectively associated with equipment units 55, 56, 57 and 58.

The configuration table 49 of the network may then be adapted to store at least in part, the priority information, in the zones Z1, Z2, Z3 and Z4 thereof, these zones being associated with the switches, for example 51, 52, 53 and 54 respectively.

Quite obviously, other embodiments may also be contemplated.

Figure 6:
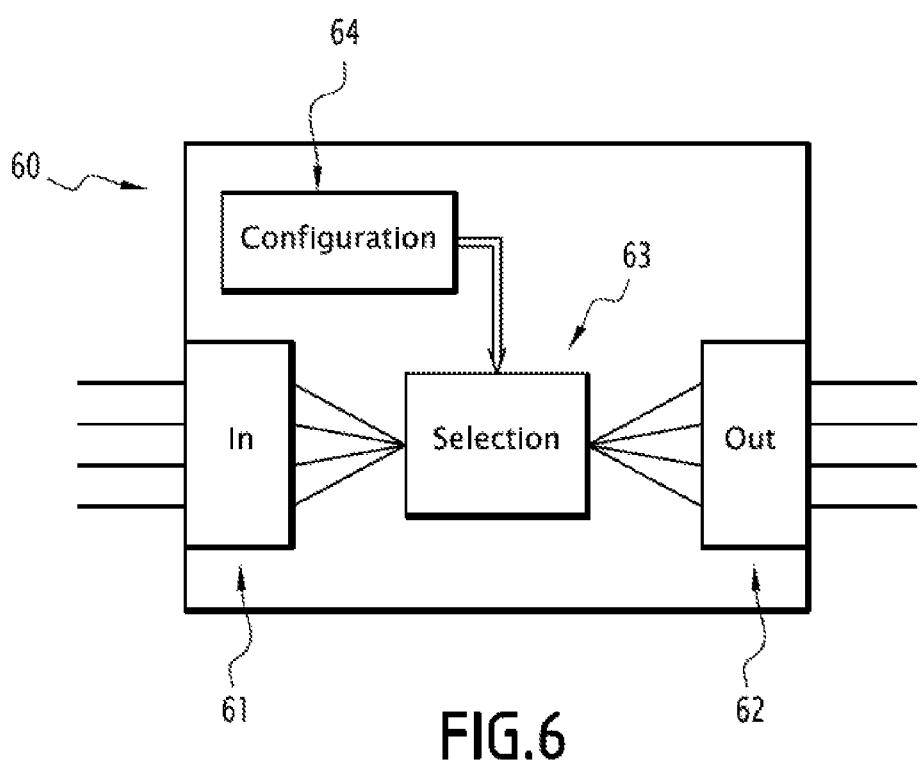

Finally, the illustration in FIG. 6 shows an example of an embodiment of a switch that that goes to make up a system according to the invention.

This latter is, for example, designated by the general reference numeral 60 in this Figure and thus includes, for example, the input and output ports respectively 61 and 62, connected to the linking means for linking this switch with the other switches in the network.

The switch then includes the selection means for selecting messages in view of their propagation in the network, these selection means being designated by the general reference numeral 63.

These selection means 63 may then be associated with a corresponding configuration table, designated by the general reference numeral 64 and setting the priorities as described above.

It can then be conceived that such a structure presents a number of advantages.

Indeed, such a system provides the ability to deploy loop physical topologies, used by transmission subscribers that are autonomous with respect to each other, autonomous with respect to the network, and without constraints, that is to say, by intrinsic resolution of time dependent loop situations.

The basic concept that has been implemented consists of introducing a priority level associated with the network topology for each of the elementary logic streams transmitted. This level is then referred to as topological priority level in complement to the functional priority level.

It thus makes it possible to open time dependent loops.

This then provides the ability to cancel them to the extent that each topological priority is decremented, for example, upon the successive pass throughs in each connection unit such as for example the network switches and this based on a priority level set at the transmission of each logic stream by the corresponding transmitting switch.

Thus, for example, for each of the elementary logic streams transmitted, there is an assignment of a priority level at the time of transmission, that is to say, the highest topological level within the corresponding functional level.

Subsequently, the topological priority is decremented on each pass through in an output port of a switch and this occurs right through to the last switch to be traversed.

Situations of interdependencies, that is to say the loops with time dependencies are broken to the extent that the application of the topological priority ensures the ability to manage in an independent fashion the elementary logic streams at the same level of functional priority originating from equipment units connected to successive switches.

Streams of data with the same topological priority originate in effect only from equipment units connected to the same switch.

The topological priority does not change the functional priority. It corresponds to an intermediate level (intra priority or sub priority) that is applicable within the functional priority of each logic stream.

Thus, for example, two logic streams having different levels of functional priority will come to be managed by the network in a manner such that the stream having the higher functional priority level shall always remain higher in priority than the one having a lower functional priority.

This remains true even if the second stream has a higher topological priority than that of the first stream at the same output port of a switch.

Thus data transmission in such a system is performed elementary logic stream by elementary logic stream, and for example, by the direction of propagation thereof.

In particular, this structure makes it possible to calculate maximum latency values for any elementary logic stream whatsoever, which was not the case in the state of the art.

Quite obviously, other embodiments may also be envisaged.

The invention claimed is:

1. A switched data transmission system, particularly for use in avionics applications, comprising:
   a plurality of electronic devices and equipment units transmitting discrete messages over a transmission network, and
   a plurality of network switches in which each of the devices and equipment units is connected, the switches connected to each other by data transmission links so as to form a physical topology of a loop network, each message being associated with information regarding data flow priority in the network comprising of functional priority information, wherein each message is also associated with information regarding topological priority of data flow in the network, wherein each network switch associates the highest level of topological priority in the corresponding level of functional priority, with a message sent by electronic equipment unit connected to this switch, wherein several levels of topological priority are defined for each level of functional priority, wherein the functional priority levels take precedence over topological priority levels, and wherein each network switch decreases systematically the level of topological priority of each message passing through this switch from one adjacent switch to another adjacent switch and keeps unchanged the level of functional priority of the message.

2. The switched data transmission system according to claim 1, wherein the priority information is embedded at least in part in the messages.

3. The switched data transmission system according to claim 1, wherein the priority information is embedded at least in part in the configuration tables of the network, associated with the switches.

4. The switched data transmission system according to claim 3, wherein each switch has a corresponding configuration table associated with a selector of messages in view of their propagation in the network.

* * * * *